A. R. WALTERS.
VISIBLE SIGNAL MECHANISM.
APPLICATION FILED FEB. 6, 1917.
1,275,111. Patented Aug. 6, 1918.
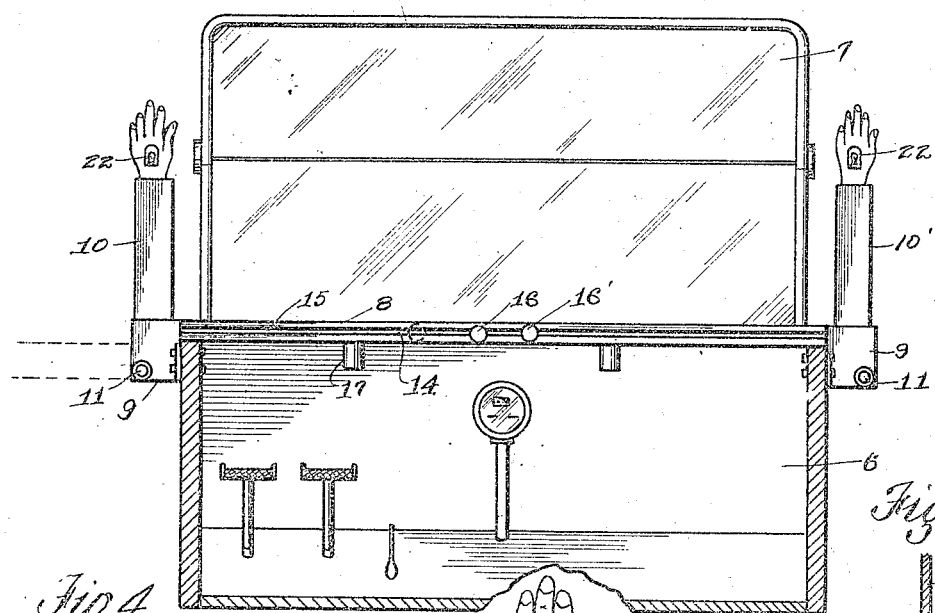
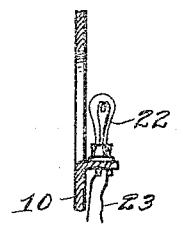
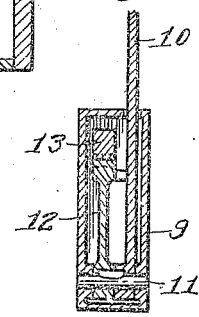
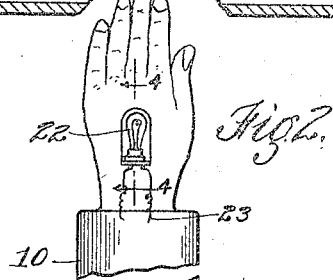
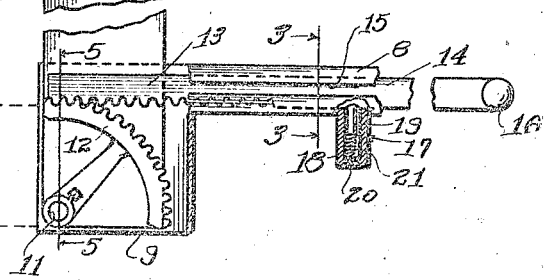
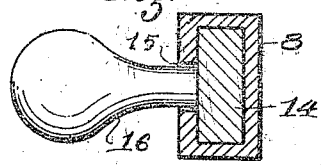
Inventor
Abram R. Walters
By Edward A. Strauss
Atty.

UNITED STATES PATENT OFFICE.

ABRAM R. WALTERS, OF ALHAMBRA, CALIFORNIA.

VISIBLE-SIGNAL MECHANISM.

1,275,111.  Specification of Letters Patent.  Patented Aug. 6, 1918.

Application filed February 6, 1917. Serial No. 146,994.

*To all whom it may concern:*

Be it known that I, ABRAM R. WALTERS, a citizen of the United States, residing at Alhambra, in the county of Los Angeles and State of California, have invented new and useful Improvements in Visible-Signal Mechanism, of which the following is a specification.

It has now become the common practice for drivers of vehicles, especially automobiles, to indicate by visible signals their intention to deviate from any path they are following. This is commonly done by holding the arm outside of the vehicle to indicate the vehicle will be turned to the side from which the arm extends. My invention relates to a visible signal mechanism for mechanically indicating the direction.

It is an object of this invention to provide a device having semaphore arms, one disposed on each side of the mechanism for operatively actuating the arms.

A further object is to provide features of design which insure certainty of operation, strength and simplicity of structure, as well as ease of manipulation.

I accomplish these objects by means of the embodiment of my invention illustrated in the accompanying drawing, in which:

Figure 1 is a vertical section through an automobile body showing my signal mechanism in position.

Fig. 2 is an enlarged elevation of one of the signal arms, and a mechanism for operating the same.

Fig. 3 is an enlarged section as seen on the line 3—3 of Fig. 2.

Fig. 4 is an enlarged fragmentary section as seen on the line 4—4 of Fig. 2.

Fig. 5 is an enlarged fragmentary section as seen on the line 5—5 of Fig. 2.

The automobile body structure shown in Fig. 1, shows the dashboard 6 and a windshield 7. The usual levers and indicating instruments are shown in proper position. Mounted upon the lower edge of the windshield and extending along the frame is a guide case 8 for the slide which operates the arms.

The automobile is equipped with a signal at each side. When the arm is in a horizontal position it indicates that the vehicle will turn to that side. Each of the arms and mechanism therefor are identical in structure, and one only will be described: A case 9 is secured to the side of the automobile. This case houses the gear for operating the arm 10. The arm 10 is in the form of a human arm, and is provided with a hand. It is pivoted, as indicated at 11, so that it may swing from a vertical to a horizontal position. The dotted lines in Fig. 2 show the arm in a horizontal position. The case may be secured to the body by bolts or any other suitable means.

Secured to the arm is a mutilated gear 12. Meshing with the gear 12 is a rack 13. The rack 13 is disposed to be moved horizontally, and thereby rotate the gear 12 through part of a revolution. This results in moving the arm from either a vertical to a horizontal, or from a horizontal to a vertical position depending upon the direction in which the rack is moved. The rack is extended to form a slide bar 14. Slide bar 14 is disposed within the casing 8 which acts as a guide. A slot 15 is formed in the front of casing 8 to permit movement of a handle 16, which extends laterally from and is secured to the slide bar 14.

In order to maintain the arm 10 in either its vertical or horizontal positions, I have provided detent means 17. The detent comprises a cylinder 18 in the bore of which is a dog 19. A head 20 is secured in the end of the bore by threads or any other suitable means, and a spring 21 is disposed between the head and the dog. The slide bar 14 is provided with notches, one of which will register with the dog when the arm 10 is in a horizontal position, and the other of which will register with the dog when the arm is in a vertical position.

It is obvious that if the driver intends to turn to the left he grasps the handle 16 on the left hand side and pushes the slide bar to the left, the arm 10 locking in its horizontal position. When the slide bar has reached its outermost position, the detent 19 will drop into the corresponding notch on the slide bar and will lock the latter in position so that arm 10 will not vibrate an unnecessary amount. To return the arm 10 to a vertical position the left hand handle is pulled to the right. This rocks the arm 10 to its vertical position, and when the slide bar has reached its innermost position the dog 19 will register with the corresponding notch in slide rod 14, and maintain the rod and arm in its vertical position. To move the right hand arm indicated by 10' the handle 16' is grasped and moved outwardly. To return the arm to its vertical position the handle 16' is pulled to the left or inwardly.

In order that the arm 10 may be visible at night, a lamp 22 is disposed on the hand portion. This lamp is supplied with electric power through conductors 23, which lead to a source of power. The arm and hand are preferably formed of sheet metal. A portion in the hand may be cut to form a tongue, which when bent laterally serves as a support for the lamp.

What I claim is:

A signaling device for motor driven vehicles, comprising a housing secured to the vehicle body adjacent its dash, a shaft rotatably mounted in said housing, a semaphore signal in imitation of a human forearm and hand rigidly mounted on said shaft, a segmental gear rigidly secured to said shaft, a horizontally disposed guide bar transversely mounted in said vehicle within reach of the vehicle operator, a manually operated rack bar slidingly mounted in said guide bar, said rack being in mesh with the segmental gear and adapted to actuate the signal on a movement thereof, and a rack bar spring actuated lock disposed on said guide bar adapted to maintain said signal in its operative or inoperative position.

In witness that I claim the foregoing I have hereunto subscribed my name this 24th day of January, 1917.

ABRAM R. WALTERS.